Sept. 15, 1959  T. C. ECKELS ET AL  2,904,280
REEL CLUTCH
Filed Oct. 1, 1956

INVENTOR.
THOMAS C. ECKELS
CHARLES JELLISON
BY
Lothrop & West
ATTORNEYS

United States Patent Office 2,904,280
Patented Sept. 15, 1959

2,904,280

REEL CLUTCH

Thomas C. Eckels and Charles Jellison, Sacramento, Calif.

Application October 1, 1956, Serial No. 613,230

3 Claims. (Cl. 242—74)

The invention relates generally to improvements in reels, and, more particularly, to improvements in motion picture projection reels.

Numerous different devices for holding motion picture film on the reel hub have been made, sold and used. Most, if not all of them, have required for proper holding that an inch or two of the leader or the last inch or two at the end of the film be bent at nearly right angles and tucked radially inwardly through a slot in the reel hub. As a consequence, when the film is subjected to some stress, for example, when the end of the film is reached, breakage frequently occurs. Even though only an inch or so is lost at each breakage, in time a considerable footage is lost. Furthermore, it is frequently difficult for the operator to find the slot, since conditions of darkness usually exist. Additionally, even though the leader, for example, is properly fed into the slot in the take-up reel, the sudden acceleration of the take-up reel causes the film to break at a weak spot such as at a spliced joint.

It is therefore an object of the invention to provide a reel clutch which diminishes the shock of sudden film acceleration.

It is another object of the invention to provide a reel clutch which enables film to be quickly and easily threaded even under the most adverse conditions of light and weather.

It is a further object of the invention to provide a reel clutch which can be used either as an attachment for existing reels or for reels especially constructed for the clutch.

It is yet a further object of the invention to provide a reel clutch which is inexpensive to make and install, yet which is durable, long-lived and reliable.

It is still a further object of the invention to provide a reel clutch which grips the end of the film securely without requiring sharp film bends.

It is yet another object of the invention to provide a generally improved reel clutch.

Other objects, together with the foregoing, are attained in the embodiment described in the following description and shown in the accompanying drawing in which.

Figure 1:
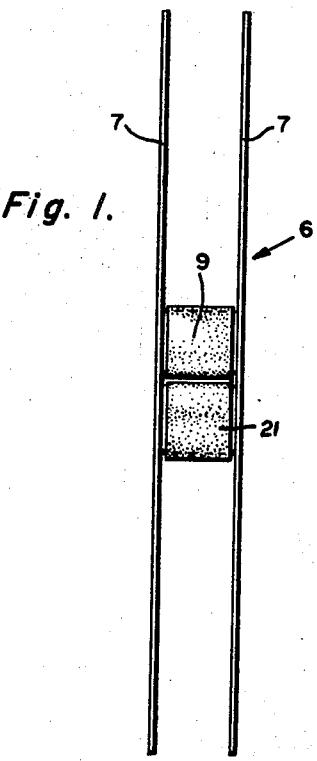
Figure 1 is an end view of a typical present-day film reel with a reel clutch of the invention installed thereon.

While the reel clutch of our invention is susceptible of numerous physical embodiments depending on the uses and environments to be encountered, and depending on whether the clutch is to be used with existing reel types or new types specifically constructed therefor, a considerable number of the herein shown and described embodiments have been made and used and have performed in an eminently satisfactory fashion.

A conventional, present-day motion picture film reel 6 comprises a pair of spaced parallel circular flanges 7, with a plurality of weight-reducing apertures 8 formed therein, the flanges 7 being coaxially mounted on a hub 9 adapted for rotation on a shaft (not shown) of the customary motion picture projector.

Currently used reels are provided, in a great majority of, if not all cases, with a slot 16 formed in the hub perimeter, the slot being parallel to the reel's axis of rotation. Customary practice involves tucking an inch or two of the film end inwardly through the slot, the film assuming a sharp bend at the slot as it is reeved or reeled over the hub.

With the reel clutch of the invention no sharp bends are necessary. A strip 21, or band, of resilient material has mounted on the reverse side 22 of the band, adjacent each end, an L-shaped clip 23, the clip being preferably of annealed spring steel, approximately 0.010 inch in thickness. The mounting leg 24 of the clip is secured to the band by an appropriate adhesive or by vulcanization. Upon being stretched around the hub perimeter, the upstanding legs 26 are placed back to back and inserted radially inwardly through the slot 16, as appears most clearly in Figure 3.

The band material is selected not only for its resilience but also for its predetermined elasticity, for its resistance to oxidation, for its longevity, its relatively constant frictional coefficient and inertness. It has been found that "neoprene" meets these requirements in admirable fashion, a thickness of $\frac{1}{64}$ inch serving well to achieve the desired holding and clutching results.

Figure 4:
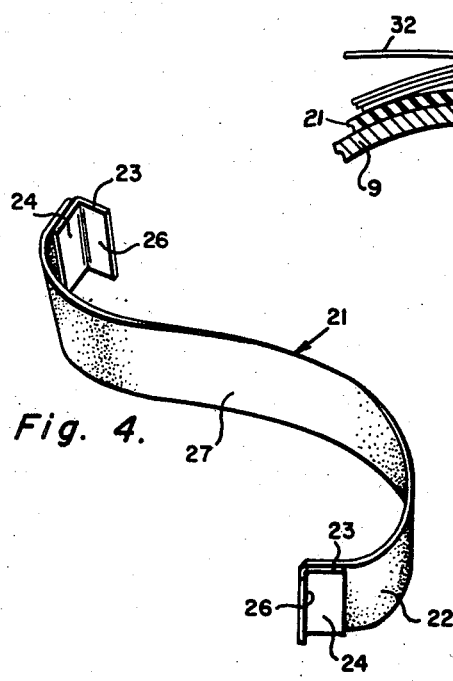
Figure 4 is a perspective of a reel clutch of the invention prior to installation.
Figure 3:
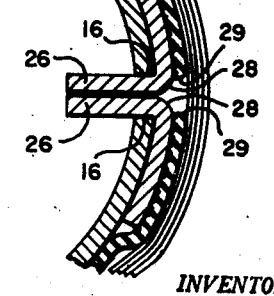
Figure 3 is a transverse section of a portion of the hub with the reel clutch installed thereon, the thicknesses and folding of the parts being exaggerated for clarity.

As appears most clearly in Figures 3 and 4, the exposed or obverse side 27 of the band presents a high friction, almost a tacky, surface. Thus, when film is to be wound on a reel it is only necessary for the operator to place the free end of the film on any portion of the installed band or clutch. Then, by rotating the reel for a part of a turn, while holding the free end in place on the band as by inserting a finger through one of the reel openings 8, a firm connection is made.

While the grip furnished by the band is totally adequate, for those who are unable to overcome the habit of threading a film end through the slot, the combined thicknesses of the legs 26 are sufficiently less in amount than the slot width to permit an operator to insert a small portion of film downwardly between the legs 26. Should an operator be unable to adapt himself to the superior method of threading around the band alone, however, the film bend is not as severe as would be the case were the film inserted in the slot in conventional style owing to the rounded contours of the clip corners 28 and the adjacent band ends 29.

In addition to providing means for winding a film on the hub without bending or cracking the film end it can be seen, as well, that as film is unwound from a reel with the clutch of our invention, and the last few inches of film are reeled off, there is no sudden jerk on the film as the projector sprockets pull the film from the slot, as is encountered with reels heretofore used.

Instead, at approximately the moment the last few inches of film is reached the remaining film on the hub separates from the band and is freely fed into the sprockets, without jerk, backlash or overhauling and without film breakage.

The reel clutch of our invention, therefore, not only provides quick and non-destructive reeling-on but a safe and easy reeling-off as well.

Additionally, owing to the unique procedure employed in tensioning the band the device provides a valuable clutch feature which is especially useful on the take-up reel. With present-day reels, the film end being threaded into the slot, film breakage occurs when the take-up wheel quickly accelerates and acquires a velocity in excess of the sprocket feed, the take-up wheel giving a sharp jerk on the portion of film between the wheel and the sprocket.

Figure 2:
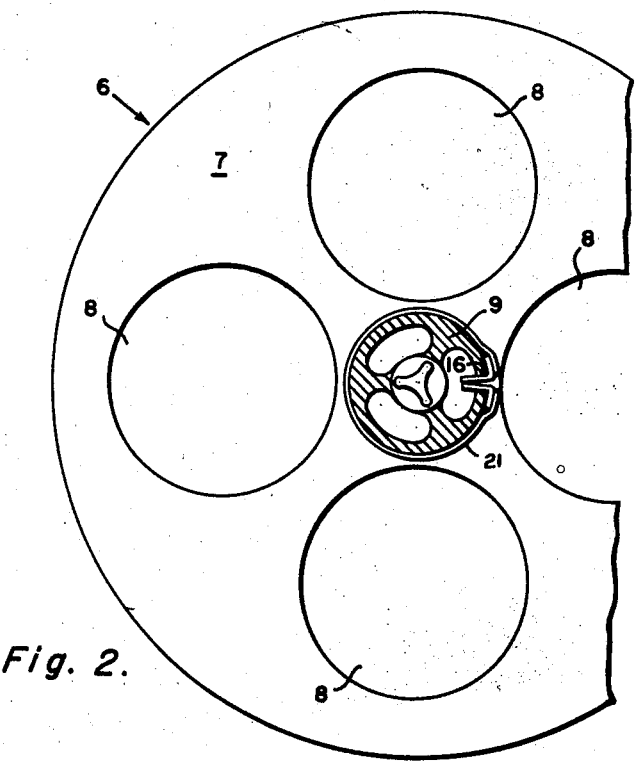
Figure 2 is a side view, the hub portion being sectioned, a portion of the figure being broken away to reduce the extent thereof.

The instant device, in this situation, acts as a clutch or shock absorber serving to absorb the energy of the take-up wheel as it rotates in the direction of the arrow 31, for example, and is braked as the film portion 32 leading from the sprocket becomes taut. As can be seen, in exaggerated fashion, in Figure 3, the resilient band mass 33 below the approximate point of tangency of the film portion 32 is caused to bunch up and to absorb some of the shock energy in so doing. Subsequently, and as the take-up reel assumes the proper registering velocity with the sprocket, the inherent resiliency in the band causes it to resume the smooth circular contour shown in Figures 1 and 2.

It can therefore be seen that the band must be stretched tightly enough so that the impressed tension will cause the band to return to smooth circular contour around the hub. On the other hand, the band must not be stretched so tightly, in installed location, that it is unable to absorb a maximum of energy as the take-up wheel is snubbed. It has been found, after very considerable experimentation that the length of the band should be such, with respect to the hub circumference, that the band when installed is stretched by an amount equal to 50% to 60% of the total amount of extension required to bring the band material to its ultimate limit before breaking. In other words, assuming that a particular piece of neoprene will stretch 10% of its unstretched length before reaching its elastic limit, a band made from such piece, when in its installed position, should be stretched from 5% to 6% of its unstretched length.

In the event a reel hub is not provided with the customary slot, a continuous uninterrupted band of appropriate length in relation to the hub circumference so as to provide the proper clutching tension can be utilized. In this event, it has been found that optimum snubbing action is obtained by securing the band to the underlying hub at at least one point, it appearing that the energy absorption characteristic of the band is most effectively realized when the band has one fixed spot on its circumference against which the balance of the band can be stretched, as in Figure 3.

It can therefore be seen that not only does the reel clutch device provide a number of desirable features pertaining to threading and taking off from film reels but it also serves in highly effective fashion to snub a reel which is overriding a projector sprocket wheel.

What is claimed is:

1. A reel clutch for a film reel having a cylindrical hub of predetermined diameter with an axially extending peripheral slot of predetermined width comprising a band of rubber-like material smooth on both sides and of substantially lesser length than the circumference of said hub, a pair of L-shaped metal clips disposed with one leg of each of said clips underlying a corresponding one of the end portions of said band and with the other legs of said clips extending in the same direction and together being of lesser width than said slot, and means for securing said clips to said band.

2. A device as in claim 1 in which the rubber-like material is such that the friction between said rubber-like material and said hub is an amount whereby under abnormal film pull against said band, portions of said band between said clips stretch and slide on said hub.

3. A device as in claim 1 in which the rubber-like material is "neoprene."

References Cited in the file of this patent
UNITED STATES PATENTS

| | | |
|---|---|---|
| 341,633 | Barker | May 11, 1886 |
| 1,003,593 | Gammeter | Sept. 19, 1911 |
| 1,386,617 | Gunderman | Aug. 9, 1921 |